US006973824B2

(12) United States Patent
Giustino et al.

(10) Patent No.: US 6,973,824 B2
(45) Date of Patent: Dec. 13, 2005

(54) TIRE STATUS DETECTION SYSTEM

(75) Inventors: James Michael Giustino, Waxhaw, NC (US); Thomas Becherer, Hannover (DE); Alan Roger Bichler, Charlotte, NC (US); Robert Yen Liu, Charlotte, NC (US)

(73) Assignee: Continental Aktiengesellschaft, Hannover (DE)

( * ) Notice: Subject to any disclaimer, the term of this patent is extended or adjusted under 35 U.S.C. 154(b) by 96 days.

(21) Appl. No.: 10/166,721

(22) Filed: Jun. 12, 2002

(65) Prior Publication Data

US 2003/0010107 A1 Jan. 16, 2003

Related U.S. Application Data

(60) Provisional application No. 60/297,262, filed on Jun. 12, 2001.

(51) Int. Cl.[7] ............................................. G01M 17/02
(52) U.S. Cl. ...................................... 73/146; 73/146.2
(58) Field of Search ........ 73/146–146.8; 340/441–447

(56) References Cited

U.S. PATENT DOCUMENTS

| 4,157,530 A | * | 6/1979 | Merz ........................... 340/445 |
| 5,559,437 A | * | 9/1996 | Baccaud et al. ............ 324/240 |
| 5,562,787 A | | 10/1996 | Koch et al. |
| 5,573,610 A | | 11/1996 | Koch et al. |
| 5,573,611 A | | 11/1996 | Koch et al. |
| 5,731,754 A | | 3/1998 | Lee, Jr. et al. |
| 5,838,229 A | | 11/1998 | Robinson, III |
| 5,960,844 A | | 10/1999 | Hamaya |
| 5,977,870 A | | 11/1999 | Rensel et al. |
| 6,182,611 B1 | | 2/2001 | Marchioro |
| 2003/0159503 A1 | * | 8/2003 | Mancuso et al. ............. 73/146 |

FOREIGN PATENT DOCUMENTS

| EP | 849 597 | | 6/1998 | |
| GB | 2263976 A | * | 8/1993 | ........... B60C 23/04 |

* cited by examiner

Primary Examiner—Max Noori
Assistant Examiner—Jermaine Jenkins
(74) Attorney, Agent, or Firm—Smith, Gambrell & Russell, LLP

(57) ABSTRACT

A method for monitoring an operating condition of a vehicular tire. The method includes providing magnetized areas in the tire and magnetic field sensors on the chassis of the vehicle. Rotation of the tire produces magnetic field pattern signatures which characterize the tire's materials, construction and deformation conditions. Changes in magnetic field pattern signatures from a baseline are indicative of impending abnormalities in tire integrity that can be recognized in advance to forestall vehicle accidents attributed to tire faults.

22 Claims, 4 Drawing Sheets

Signature characteristics that corresponding to splice construction details.

Figure 1. Signature characteristics that corresponding to splice construction details.

Figure 2. Modified step-speed endurance test.

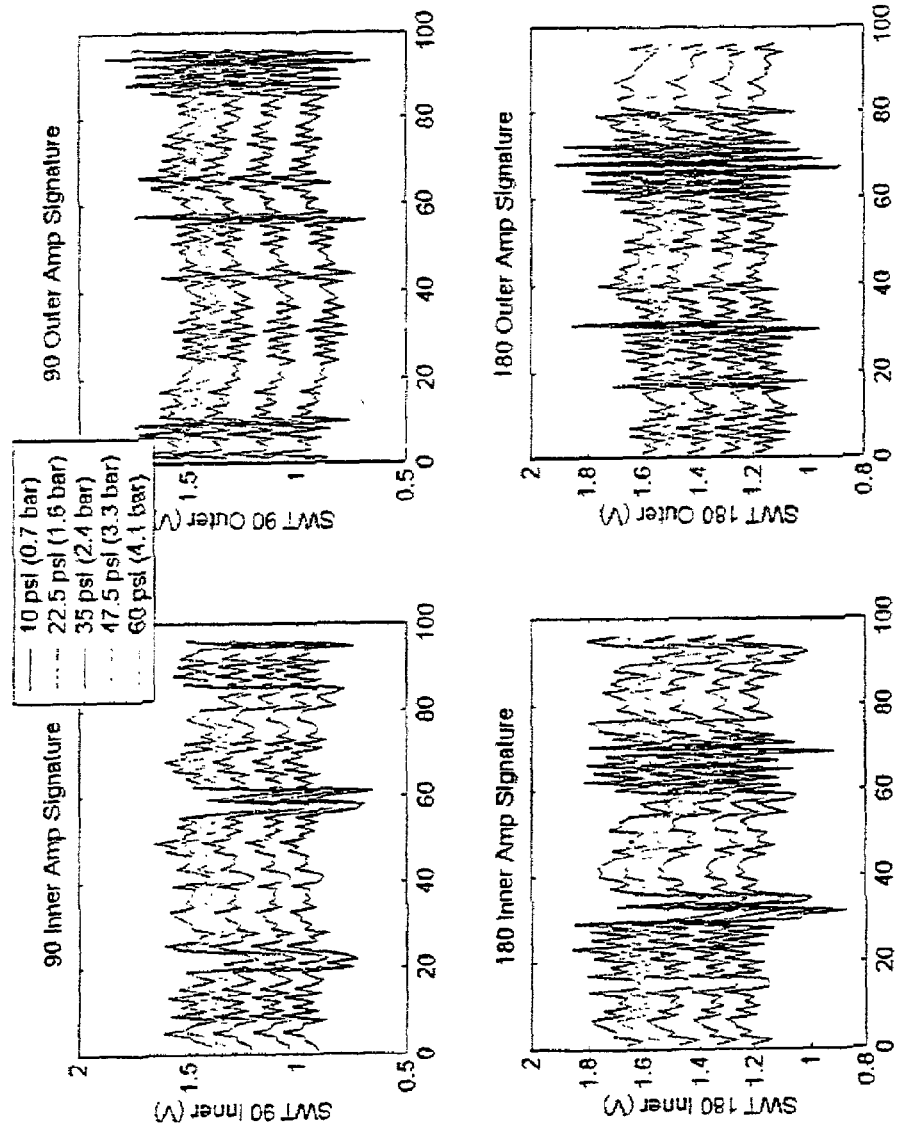
Figure 4. Signature changes as a function of air pressure changes.

TIRE STATUS DETECTION SYSTEM

This application claims the benefit of provisional U.S. application Ser. No. 60/297,262 filed Jun. 12, 2001, under 35 U.S.C. 119(e)(1).

BACKGROUND OF THE INVENTION

Tire manufacturers exercise the greatest care in constructing modem tires for a variety of vehicles. As the traveling speeds and distances traveled increase with more people on the roadways traveling at higher velocities and even greater distances than some years ago, tire manufacturers are assiduously working towards greater improvement in tire performance.

With the increased popularity of all terrain vehicles and the demands that owners make regarding performance of such vehicles, the need has arisen for greater safety and predictability with respect to tire characteristics.

As tire manufacturers strive to perfect their tires, they recognize the difficulty in achieving a tire with zero probability of error. Nevertheless, researchers and engineers work towards the development of an "intelligent tire" that will minimize the risk of a catastrophic failure.

Thus, efforts have taken the form of developing a tire that will enable the driver to recognize an impending tire failure from having fill information about the operating condition of the tire far enough in advance so that the vehicle can be brought to a standstill safely in a time span short of an accident.

As described in European Patent Application 849 597, a tire comprising at least one magnetized area can be used to provide information regarding the rotary speed of the tire when mounted on a vehicle. In addition, the tire may also provide information regarding the forces and/or torques acting on the tire, in particular, the circumferential torque, lateral force and radial force. We call this type of tire either an Intelligent® Tire or SWT® (Side Wall Torsion system) tire.

Usually, a magnetic field sensor(s) is mounted on the chassis of the vehicle. As the Intelligent® Tire rotates past the magnetic sensor(s) at a constant angular velocity, a magnetic field pattern or signature develops that is characteristic of the tire's materials, construction and deformation state. In particular, magnetic field amplitude signatures and phase signatures (difference in the alignment of two annular magnetic bands, one near the bead of the tire and the other near the tread) are found to be useful. For example, if the angular velocity of the tire changes, such as through a braking or acceleration maneuver, the magnetic field signature also changes, thus allowing for the measurement of circumferential torque acting on the tire using suitable algorithms. Furthermore, as described in U.S. patent application Ser. No. 09/307,605, when any deformation of the Intelligent® Tire occurs, such as through the application of a lateral force resulting from a cornering maneuver, there is an accompanying change in the magnetic field signature allowing for the measurement of the acting force using suitable algorithms. The information can be interfaced to vehicle control systems to improve, for example, antilock braking systems (ABS), traction control systems (TCS), rollover prevention systems (ROP) and electronic stability program (ESP) performance.

In the past, such monitoring activities generally used a passive integrated circuit embedded within the body of the tire and activated by a radio frequency transmission which energizes the circuit by inductive magnetic coupling. Passive devices which rely on inductive magnetic coupling or capacitive coupling generally have the disadvantage of requiring lengthy coil windings, thus requiring major modifications in the tire construction and assembly process. Another serious disadvantage with such passive devices is that an interrogator must be positioned in very close proximity to the tire, usually within a few inches of the tire, in order to allow communication between the tire and the device. Because of the proximity requirements, continuous monitoring is impractical since it would require that an interrogator be mounted at each wheel of the vehicle. Manual acquisition of data from the passive devices embedded in each of the tires of a parked vehicle is also cumbersome and time consuming because of the proximity requirements.

Another disadvantage with known tire monitoring and identification devices is that communication transmissions are achieved using conventional radio frequencies which generally require a relatively large antenna which must be mounted externally or secured to the tire in such a manner which requires relatively major modifications in the tire construction or assembly process.

Prior approaches to monitoring tire conditions and identification with various communication techniques have met with limited success. In one approach disclosed in U.S. Pat. No. 5,960,844, a method for monitoring tires included an activatable memory device permanently mounted within at least one tire of a vehicle on the inner surface. The device contained stored data pertaining to the tire, and in which the memory device was activated by means of a monitoring device mounted on the tire rim within the pressurized cavity formed within the tire.

In a different approach shown in U.S. Pat. No. 5,573,610, a method for monitoring various conditions of pneumatic tires and to tires containing a monitoring device involved monitoring tires which used an active, self-powered, programmable electronic device which was generally installed in or on the interior portion of a pneumatic tire or on a tire rim. The device could be used for monitoring, storing and telemetering information such as temperature, pressure, tire mileage and/or other operating conditions of a pneumatic tire along with tire identification information.

In yet another approach, U.S. Pat. No. 5,562,787, a method of monitoring tires was provided in which an activatable monitoring device was mounted within at least one tire of a vehicle, on the interior surface thereof, or on the tire rim. The device was activated by means of an interrogator signal having a frequency in the microwave range. In response to the signal, the monitoring device measured and transmitted information relating to one or more conditions such as the internal pressure and temperature of the tire, the number of rotations of the tire, and tire identification information. The monitoring device was secured within the tire in such a manner and location as to minimize stress, strain, cyclic fatigue, impact and vibration.

In still yet another approach, U.S. Pat. No. 5,573,611, the invention depicted was a method of monitoring tires which used an active, self-powered programmable electronic device which was installed in or on the interior surface of a pneumatic tire or on a tire rim. The device was activated by externally transmitted radio frequency waves and in response, the device compared or transmitted information and provided a warning in the event a preselected limit was exceeded. An interrogator was used to communicate with and retrieve digitally coded information from the electronic monitoring device.

In U.S. Pat. No. 5,838,229, a system for indicating low tire pressure in vehicles was depicted. Each vehicle wheel had a transmitter with a unique code. A central receiver in the vehicle was taught, at manufacture, to recognize the codes for the respective transmitters for the vehicle, and also a common transmitter code, in the event one of the transmitters needed to be replaced. During vehicle operation and maintenance, when the tires were rotated, the system could be recalibrated to relearn the locations of the transmitters.

In another application, U.S. Pat. No. 5,731,754, the invention included a transponder and sensor apparatus with on-board power supply mounted in or on a vehicle tire. A pressure sensor, a temperature sensor and a tire rotation sensor were mounted in a housing along with the transponder the power supply and an antenna. Upon receipt of an interrogation signal from a remote interrogator, the transponder activated the sensors to sense tire pressure and temperature and then backscatter-modulate the radio frequency signal from the interrogator with the tire condition parameter data from the sensors to return the backscatter modulated signal to the interrogator.

In yet another application, U.S. Pat. No. 5,977,870, a method for monitoring various engineering conditions of a pneumatic tire such as temperature, pressure, tire rotation and other operating conditions of the tire was depicted. A tire tag was mounted on the interior of the tire within the pressurizable cavity and contained the stored data and sensors for detecting certain conditions within the cavity. A separate transponder was mounted on the tire rim. The tire tag contained a battery, an antenna and stored data pertaining to the tire. The transponder used electronic circuitry for collecting data from the tire tag. The tire tag was actuated by transmitted radio frequency waves from the transponder, which data was transmitted by the transponder to the remote location by an antenna which extended from the transponder through the rim to a location externally of the tire.

In spite of the teachings of the above-mentioned patents, there is still a significant need for a tire monitoring system for sensing, transmitting, and interpreting the operating condition of the vehicular tire in advance of an impending failure. This information could be used to bring the vehicle to a standstill safely in a time span short of an accident.

SUMMARY OF THE INVENTION

Recently it has been found that the amplitude and phase signatures may be used as a sensitive measure of the operating condition (state) of the tire. For example, tread, sidewall and bead splices that are overlapped too far or separated too much can be identified from the characterization of the magnetic signatures as is done routinely during the manufacture of the Intelligent® Tire. The present invention relates to a method for monitoring the operating condition or "state" of a vehicular tire. The method includes employing magnetized areas in the vehicle tire, and magnetic field sensors on the vehicle chassis at predetermined locations. As the tire is rotated at a constant angular velocity, a magnetic field pattern (signature), characteristic of the tire's materials, construction and deformation conditions, is established. The amplitude and phase (difference in the alignment of two annular magnetic bands, one near the bead of the tire and the other near the tread) signatures of the magnetic field pattern reflect the tire's tread, sidewall and bead conditions. A change in the signature of one tire, without a corresponding change in the signatures of the remaining vehicle tires, would indicate a problem with that particular tire that could be attributed to low inflation, the onset of tread separation, a problem with the bead or perhaps an incipient sidewall failure.

BRIEF DESCRIPTION OF THE DRAWINGS

The present invention will be further understood with reference to the drawings, wherein:

FIG. 4 is a plot showing the signature change as a function of tire air pressure changes.

DETAILED DESCRIPTION OF THE INVENTION

Figure 1:
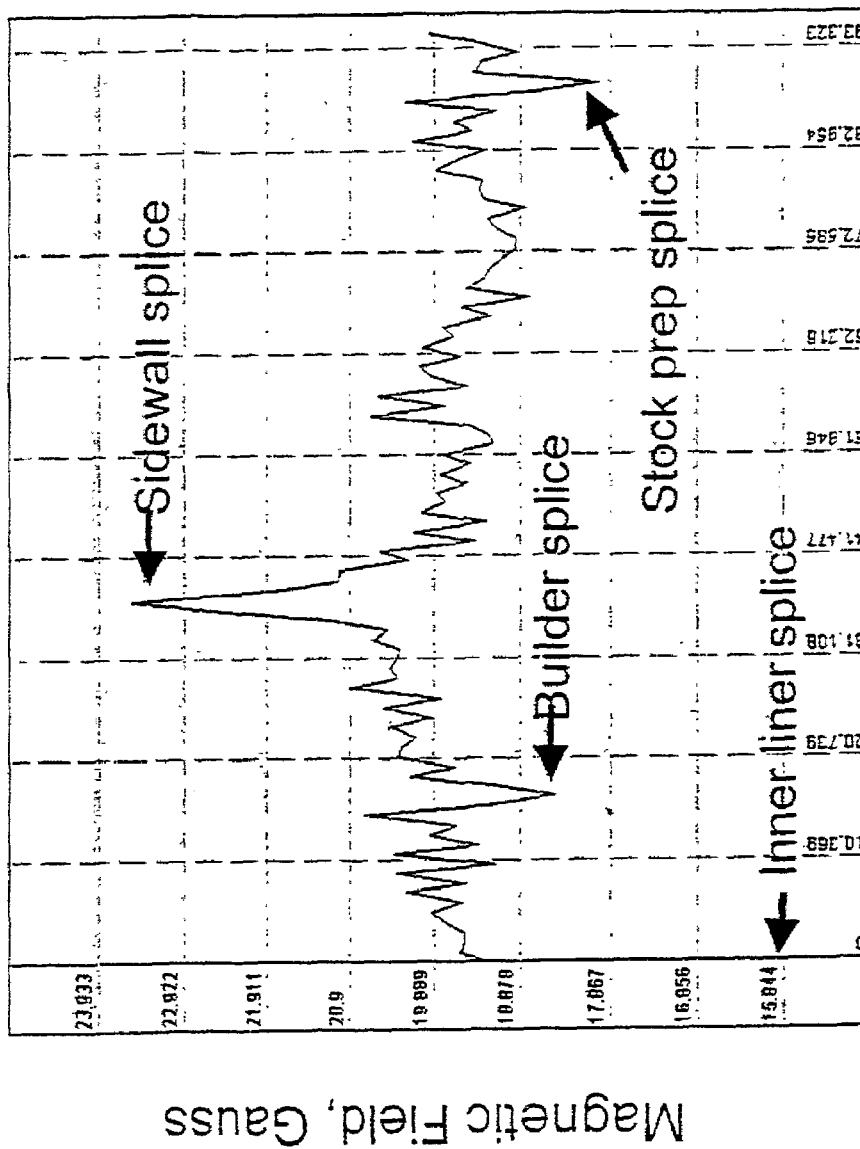
FIG. 1 is a plot of signature characteristics corresponding to splice construction of a tire.

In one embodiment of the invention it is intended to make the SWT tire "more intelligent" and address some of the issues relating to failure of tires. The SWT data is used for more than just a measure of the lateral force, circumferential torque and, possibly the normal load acting on the tire. The SWT phase and amplitude "signatures" can be used as a sensitive measure of the "state" of the tire. For example, tread, sidewall and bead splices that are overlapped too far or separated too much readily show up during magnetization characterizations routinely run on SWT tires which include at least one magnetized area (not shown) in the tire. Anything that affects the geometry or stiffness (compliance) of the SWT tire is reflected in its magnetic signatures. In particular, a change in the signature of one tire, without a corresponding change in the signatures of the other three, would probably indicate a problem with that tire possibly due to low inflation, the onset of tread separation, a problem with the bead or perhaps an incipient sidewall failure. In field tests (FIGS. 1–4), tread separation failures were introduced by building tires with a small amount of polyethylene between the belt and tread and then running them on a pulley wheel (not shown) while monitoring, through the use of magnetic field sensors (Not shown), the SWT signatures. This enabled detection of incipient tread separations. Tread separations can occur without the loss of inflation pressure, so that traditional tire pressure monitoring systems may be of no use in detecting these tire failures while SWT would offer an unparalleled safety advantage.

Algorithms (not shown) are required similar to the existing prior art digital data systems but, instead of looking at changes in the radius of the tire and relating these changes to inflation pressure, changes in the SWT signatures would be related to inflation pressure. Monitoring the signatures of all four tires would probably be required. For example, an AKRON "C" machine could be used to obtain the required data relating inflation pressures to SWT signature changes. Some work has already been done during FMEA studies of the effect of inflation pressure variations on SWT stiffness (compliance).

SWT technology could be used to measure normal load variations and thus use the data for anti roll over control and enhance suspension control systems. Tests have been performed using two sets of SWT magnetic field sensors (not shown). The first set was placed at the usual 180 degree position (using zero degrees to mark the tire footprint). The second set was placed at 225 degrees from the tire footprint. A bilinear fit algorithm (not shown) allowed not only prediction of lateral forces and circumferential torques better than with just the usual 180 degree pair of sensors, but also gave an excellent prediction of normal load variations. A second pair of sensors at the 270 or 90 degree positions enabled measuring normal loads. Easily mountable sensors on a vehicle at these positions is problematic. The 225 degree position is possible.

For example, as shown in FIG. 1, at a location where a sidewall splice is overlapped too far or separated too much, the amplitude of the magnetic field at that location is either increased or decreased, correspondingly. Locations where tread splices are overlapped too far or separated too much may also be reflected in the magnetic field signature. Apparently, the non-uniformity detected at the tread splice affects the uniformity of the adjacent magnetic material in the sidewall of the tire. Anything that affects the geometry or the stiffness (compliance) of the Intelligent® Tire is reflected in its magnetic signatures.

Figure 2:
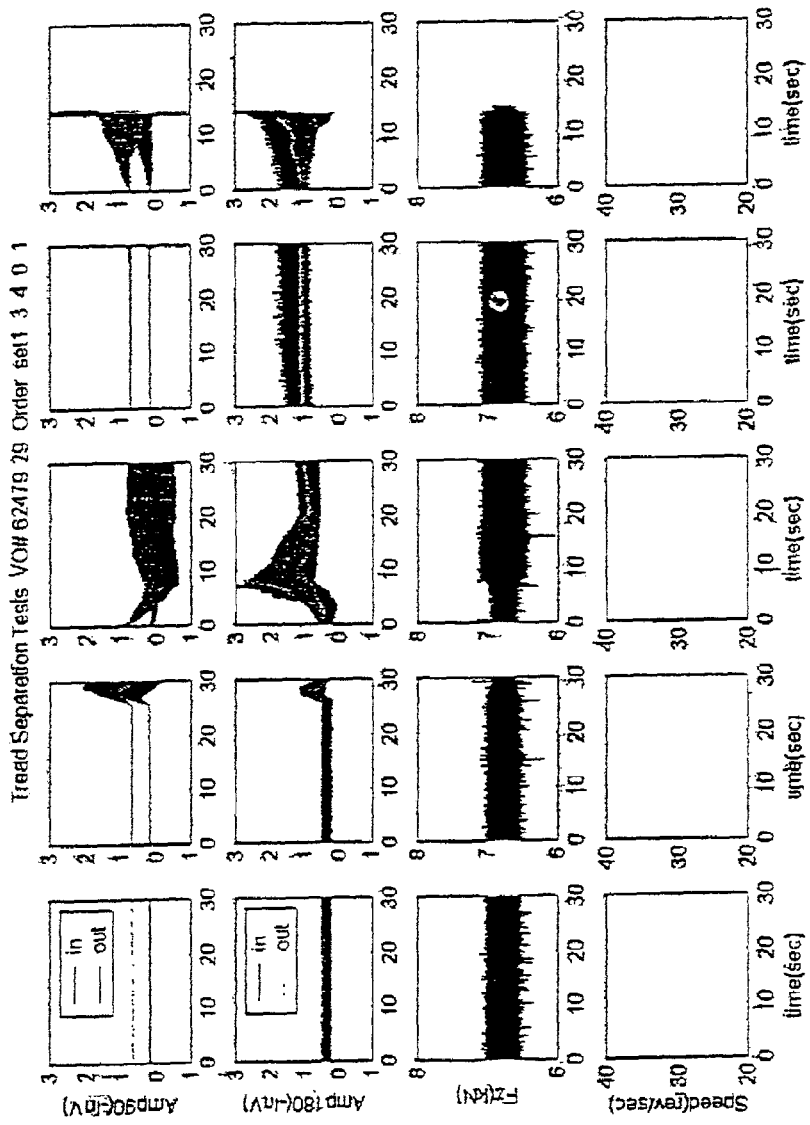
FIG. 2 depicts the change in amplitude signature showing tire tread separation.

Monitoring of the signatures is particularly useful in predicting the onset of imminent tire failure, for example due to a tread separation at high speed. FIG. 2 depicts a modified step-speed endurance test. FIG. 2 shows data taken at 120 mph and 150 mph in 30 second frames. Top two rows show magnetic field data taken with magnetic field sensors (not shown) mounted at 90 and 180 degrees from the tire contact patch. The bottom two rows show the normal load, kN, and speed, revolutions per second (corresponding to 120 and 150 mph), respectively. Magnetic field sensors (not shown) were mounted on a high speed dynamometer at 90 and 180 degrees from the tire footprint to monitor the magnetic field of an Intelligent® Tire. Two sensors were mounted at each position, one at the "in" position, i.e., close to the bead of the tire and one at the "out" position, close to the tread of the tire. Thus, both phase and amplitude signatures were measured at each position. In addition to the magnetic field data, vertical load in kN and tire speed in revolutions per second were collected at a sampling rate of 75,000 samples per second. Thirty seconds of data were collected and stored in the computer in five sequential files. After five files were collected, the sequence repeats starting with file one. Thus a continuous record of events traced back 150 seconds prior to tire failure was available. (A slight interruption occurred after every 30 seconds that depended on the time taken to write the file to hard disk and resume data collection).

Figure 3:
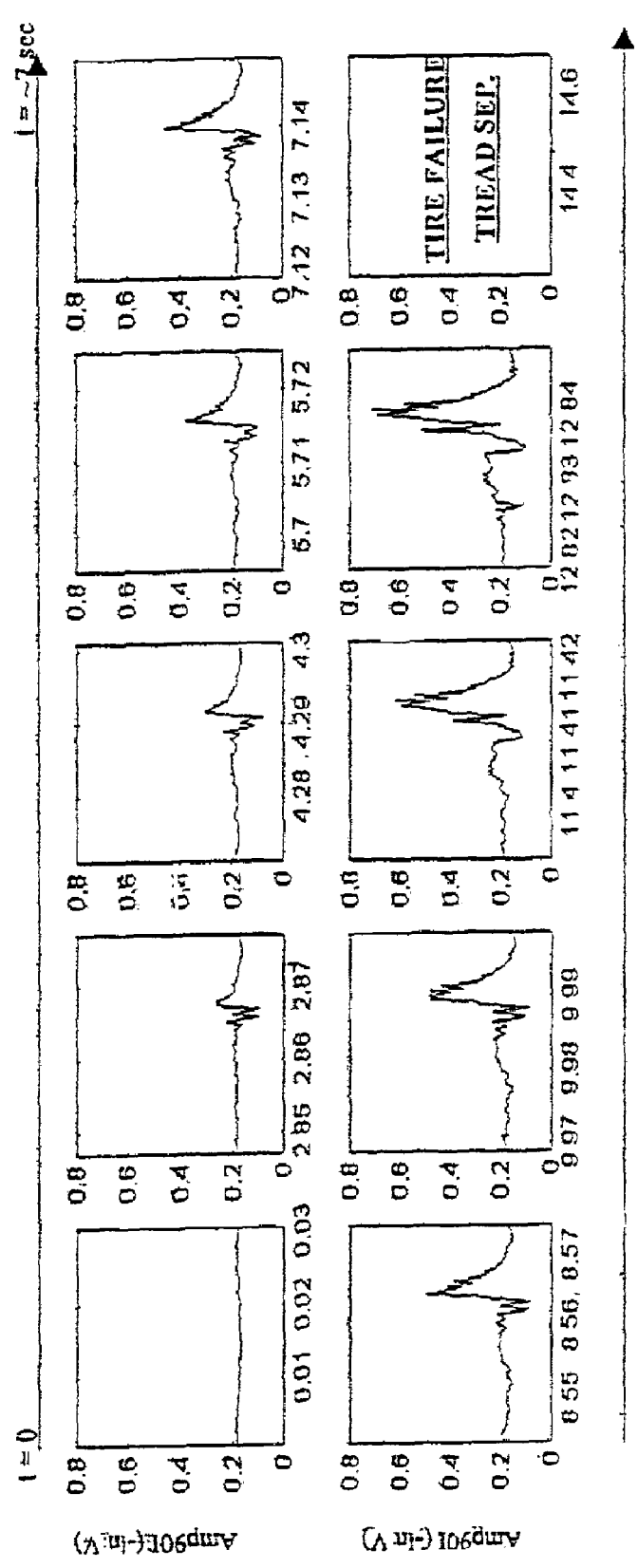
FIG. 3 depicts amplitude signature change during imminent failure of a vehicle tire.

FIG. 3 shows expansion of Amplitude data (see FIG. 1) at the 90 degree, inner sensor position. Each frame shows a single tire revolution, thus a signal amplitude signature, starting at the times indicated on the Horizontal axes in seconds. Tire failure due to tread separation occurred at approximately 14 seconds. A marked change in the signature from the base line (shown in frame one) can be clearly seen at the 2.86 second mark (frame two) and grows with each successive frame, apparently corresponding to the growth of the tread separation.

FIG. 4 depicts the changes in magnetic field patterns that represent the tire signatures regarding tire inflation pressures. In everyday use, the signature from one tire would be compared to the signatures of the remaining vehicle tires, and any marked changes from an established base line would indicate that a tire failure was imminent.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for monitoring an operating condition of a vehicular tire, comprising:
   providing at least one magnetized area in a tire of a vehicle;
   providing at least one magnetic field sensor at a predetermined location on a vehicle chassis;
   recording at least one time period between passing of the at least one magnetized area and the at least one magnetic field sensor during rotation of the vehicular tire;
   computing a magnetic field pattern that is characteristic of the vehicular tire's materials, construction and deformation conditions; and
   calculating the operating condition of the vehicular tire wherein the operating condition includes tread, sidewall and bead conditions.

2. The method according to claim 1, further comprising providing the at least one magnetized area in every tire of the vehicle.

3. The method according to claim 1, further comprising providing multiple magnetic field sensors at predetermined locations on the chassis of the vehicle.

4. The method according to claim 1, further comprising providing two sets of magnetic field sensors, wherein using 0° as a footprint mark, a first set placed at a 180° position on the tire, and a second set placed at 225° from the footprint.

5. The method according to claim 1, wherein the magnetic field pattern further comprises phase and amplitude signatures of the vehicle tire.

6. The method according to claim 5, further comprising comparing a change in the phase and amplitude signatures of one tire, to other phase and amplitude signatures of remaining tires of the vehicle.

7. The method according to claim 5, further comprising employing a bilinear fit algorithm to the phase and amplitude signatures to predict lateral forces, circumferential torques and load variations.

8. A method for monitoring an overlapping of vehicular tire tread splices employing the method of claim 1.

9. A method for monitoring vehicular tire pressures employing the method of claim 1.

10. The method according to claim 1, further comprising forwarding the calculated operating condition of the vehicular tire to vehicle control systems including antilock braking systems, traction control systems, rollover prevention systems, and electronic stability program performance.

11. A method for monitoring a separation of vehicular tire tread splices employing the method of claim 1.

12. The method according to claim 1, further comprising rotating the vehicular tire at a constant angular velocity.

13. The method according to claim 1, further comprising applying said method to every tire on the vehicle.

14. The method according to claim 1, wherein the at least one magnetic field sensor is positioned close to a bead of the tire and wherein a second at least one magnetic field sensor is positioned close to a tread of the tire.

15. The method according to claim 1, wherein the at least one magnetic field sensor is located at 180° from a tire footprint and a second at least one magnetic field sensor is located at 90° from the tire footprint.

16. The method according to claim 1, wherein the at least one magnetic field sensor is located at 180° from a tire footprint and a second at least one magnetic field sensor is located at 270° from the tire footprint.

17. The method according to claim 1, wherein the at least one magnetic field sensor is located at 180° from a tire footprint.

18. A method for monitoring an overlapping of vehicular tire sidewall splices, comprising:
   providing at least one magnetized area in a tire of a vehicle;
   providing at least one magnetic field sensor at a predetermined location on a vehicle chassis;
   recording at least one time period between passing of the at least one magnetized area and the at least one magnetic field sensor during rotation of the vehicular tire;
   computing a magnetic field pattern that is characteristic of the vehicular tire's materials, construction and deformation conditions; and
   calculating the operating condition of the vehicular tire wherein the operating condition includes sidewall conditions.

19. A method for monitoring a separation of vehicular tire sidewall splicer, comprising:
   providing at least one magnetized area in a tire of a vehicle;
   providing at least one magnetic field sensor at a predetermined location on a vehicle chassis;
   recording at least one time period between passing of the at least one magnetized area and the at least one magnetic field sensor during rotation of the vehicular tire;
   computing a magnetic field pattern that is characteristic of the vehicular tire's materials, construction and deformation conditions; and
   calculating the operating conditions of the vehicular tire wherein the operating condition includes sidewall splices.

20. A method for monitoring separation of vehicular bead splices comprising:
   providing at least one magnetized area in a tire of a vehicle;
   providing at least one magnetic field sensor at a predetermined location on a vehicle chassis;
   recording at least one time period between passing of the at least one magnetized area and the at least one magnetic field sensor during rotation of the vehicular tire;
   computing a magnetic field pattern that is characteristic of the vehicular tire's materials, construction and deformation conditions; and
   calculating the operating condition of the vehicular tire wherein the operating condition includes bead conditions.

21. A method for monitoring an overlapping of vehicular bead splices comprising:
   providing at least one magnetized area in a tire of a vehicle;
   providing at least one magnetic field sensor at a predetermined location on a vehicle chassis;
   recording at least one time period between passing of the at least one magnetized area and the at least one magnetic field sensor during rotation of the vehicular tire;
   computing a magnetic field pattern that is characteristic of the vehicular tire's materials, construction and deformation conditions; and
   calculating the operating condition of the vehicular tire wherein the operating condition is overlapping of vehicular bead splices.

22. A method for monitoring an operating condition of a vehicular tire mounted on a running vehicle, comprising:
   providing at least one magnetized area in a tire of a vehicle;
   providing at least one magnetic field sensor at a predetermined location on a vehicle chassis;
   recording, during the running of the vehicle at least one time period between passing of the at least one magnetized area and the at least one magnetic field sensor during rotation of the vehicular tire;
   computing a magnetic field pattern that is characteristic of the vehicular tire's materials, construction and deformation conditions; and
   calculating the operating condition of the vehicular tire during the running of the vehicle wherein the operating condition includes tread, sidewall and bead conditions.

* * * * *